(12) United States Patent
Sato

(10) Patent No.: US 10,710,218 B2
(45) Date of Patent: Jul. 14, 2020

(54) COMPLIANCE UNIT WITH LOCKING MECHANISM

(71) Applicant: SMC CORPORATION, Chiyoda-ku (JP)

(72) Inventor: Motohiro Sato, Toride (JP)

(73) Assignee: SMC CORPORATION, Chiyoda-ku (JP)

( * ) Notice: Subject to any disclaimer, the term of this patent is extended or adjusted under 35 U.S.C. 154(b) by 114 days.

(21) Appl. No.: 16/029,141

(22) Filed: Jul. 6, 2018

(65) Prior Publication Data
US 2019/0009391 A1    Jan. 10, 2019

(30) Foreign Application Priority Data

Jul. 6, 2017 (JP) .................................. 2017-132898

(51) Int. Cl.
*B25B 11/02* (2006.01)
*B25J 17/02* (2006.01)
(Continued)

(52) U.S. Cl.
CPC .............. *B25B 11/02* (2013.01); *B23P 19/10* (2013.01); *B23Q 1/0063* (2013.01); *B25J 17/0233* (2013.01)

(58) Field of Classification Search
CPC ....... B23P 19/10; B23P 19/102; B23P 19/105; B23Q 3/183; B23Q 3/186; B25J 17/0208; B25J 17/0233
See application file for complete search history.

(56) References Cited

U.S. PATENT DOCUMENTS 4,092,719 A * 5/1978 Salmon .................. B23P 19/12
 700/95
4,594,762 A * 6/1986 Och ...................... B23P 19/102
 29/281.4

(Continued)

FOREIGN PATENT DOCUMENTS

DE  10 2015 214 003 A1  1/2017
FR      2 527 968 A1   12/1983
(Continued)

OTHER PUBLICATIONS

Extended European Search Report dated Feb. 1, 2019 in corresponding European Patent Application No. 18181472.4, citing documents AO-AQ therein 5 pages.

*Primary Examiner* — Tyrone V Hall, Jr.
(74) *Attorney, Agent, or Firm* — Oblon, McClelland, Maier & Neustadt, L.L.P.

(57) ABSTRACT

A compliance unit includes a return piston that causes a first body and a second body to return to a home position and a locking mechanism that locks the return piston in the home position. The locking mechanism includes a locking member that is capable of being freely displaced to a locking position where the locking member is fixed in place by being in contact with the return piston and to a non-locking position where the locking member is not in contact with the return piston and is not fixed in place, a locking spring that presses the locking member toward the locking position, an unlocking piston that presses the locking member toward the non-locking position, an unlocking pressure chamber that causes the unlocking piston to generate thrust, and an unlocking port for supplying air to the unlocking pressure chamber.

7 Claims, 9 Drawing Sheets

(51) Int. Cl.
  *B23P 19/10* (2006.01)
  *B23Q 1/00* (2006.01)

(56) References Cited

U.S. PATENT DOCUMENTS

| | | | | |
|---|---|---|---|---|
| 4,702,667 A | * | 10/1987 | Hounsfield | B25J 17/0208 403/32 |
| 4,708,175 A | * | 11/1987 | Janashak | B25J 15/0019 141/1 |
| 4,717,003 A | * | 1/1988 | McCormick | B25J 17/0208 192/116.5 |
| 4,789,292 A | * | 12/1988 | Holcomb | B23P 19/006 414/744.8 |
| 4,801,240 A | * | 1/1989 | Hautau | B25J 17/0208 248/287.1 |
| 4,848,546 A | * | 7/1989 | McCormick | B25J 17/0208 192/56.32 |
| 4,896,431 A | * | 1/1990 | Danmoto | B23P 19/102 33/520 |
| 5,487,539 A | * | 1/1996 | Obrist | B23Q 3/183 269/309 |
| 6,224,121 B1 | * | 5/2001 | Laubach | B25J 15/04 294/183 |
| 8,794,418 B1 | * | 8/2014 | Norton | B25J 17/0208 192/150 |
| 2004/0046302 A1 | * | 3/2004 | Bernhard | B23B 31/107 269/309 |
| 2007/0163377 A1 | * | 7/2007 | Miyazawa | B23P 19/102 74/490.03 |
| 2008/0061486 A1 | * | 3/2008 | Kuroda | B23Q 1/0081 269/48.1 |
| 2013/0043634 A1 | * | 2/2013 | Kitaura | B23Q 1/0063 269/309 |
| 2014/0270926 A1 | * | 9/2014 | Norton | F16D 41/086 403/322.2 |
| 2015/0167719 A1 | * | 6/2015 | Canuto | B23B 31/1071 403/328 |
| 2018/0207811 A1 | | 7/2018 | Rueb | |

FOREIGN PATENT DOCUMENTS

| | | |
|---|---|---|
| JP | 59-110593 | 6/1984 |
| JP | 1-121193 A | 5/1989 |
| JP | 9-10931 | 4/1997 |
| JP | 2002-307366 | 10/2002 |

* cited by examiner

COMPLIANCE UNIT WITH LOCKING MECHANISM

TECHNICAL FIELD

The present invention relates to a compliance unit used for accommodating, when coupling workpieces together or when setting a workpiece at a predetermined position on a worktable, misalignment between the workpieces, positional deviation of the workpiece with respect to the worktable, and the like.

BACKGROUND ART

Known examples of this type of compliance unit are disclosed in Patent Literatures 1 to 3. This compliance unit includes a first body and a second body, which are coupled to each other while having a degree of freedom with which the first body and the second body are displaceable relative to each other, and is used by attaching the first body to a robot hand and attaching a workpiece-holding unit to the second body. When a workpiece held by the workpiece-holding unit is inserted into an insertion hole of another workpiece set on a table so as to be coupled to the other workpiece, if there is a misalignment between the workpiece and the insertion hole, the compliance unit accommodates the misalignment by displacing the second body.

The compliance unit has a returning mechanism for causing the second body to return to a home position and restraining the second body at the position. This returning mechanism operates when the workpiece-holding unit holds and transports a workpiece to a coupling position and restrains the second body at the home position so as to prevent the workpiece from being displaced due to displacement of the second body and to prevent the workpiece from breaking as a result of being displaced.

However, the returning unit operates by using air, and thus, there has been a problem in that, if the air supply to the returning mechanism is shut off due to an unexpected cause during the period when the workpiece is transported by the workpiece-holding unit, the returning unit does not function, and the second body is displaced, which in turn results in positional deviation of the workpiece.

CITATION LIST

Patent Literature

[PTL 1] Japanese Unexamined Patent Application Publication No. 2002-307366
[PTL 2] Japanese Unexamined Patent Application Publication No. 59-110593
[PTL 3] Japanese Unexamined Patent Application Publication No. 9-103931

SUMMARY OF INVENTION

Technical Problem

It is a technical object of the present invention to provide a compliance unit having a high level of safety and capable of restraining a first body and a second body at a home position even if air is shut off during the period when a returning mechanism is operating.

Solution to Problem

A compliance unit with a locking mechanism according to the present invention includes a first body and a second body that are capable of moving parallel relative to each other within a predetermined area centered on a home position, a returning mechanism that causes the first body and the second body to return to the home position, and a locking mechanism that locks the returning mechanism in the home position. The home position is a position where a first axis that is a central axis of the first body and a second axis that is a central axis of the second body coincide with each other.

The returning mechanism includes a ball that is disposed in the first body so as to be capable of being freely displaced in a direction along the first axis and so as to be integrated with the first body in a direction perpendicular to the first axis, a conical hole that is formed at a position in the second body at which an end portion of the ball is fitted into the conical hole, a return piston that is disposed in the first body so as to be capable of freely moving forward and rearward in the direction along the first axis and that is in contact with a base end portion of the ball at an end of the return piston, a return spring and a return pressure chamber that cause the return piston to generate thrust in a direction in which the ball is pressed against the conical hole, and a return port for supplying air to the return pressure chamber.

The locking mechanism includes a locking member that is capable of being freely displaced to a locking position where the locking member is fixed in place by being in contact with the return piston and to a non-locking position where the locking member is not in contact with the return piston and is not fixed in place, a locking spring that presses the locking member toward the locking position, an unlocking piston that presses the locking member toward the non-locking position, an unlocking pressure chamber that causes the unlocking piston to generate thrust, and an unlocking port for supplying air to the unlocking pressure chamber.

In the present invention, the locking member is disposed so as to be capable of being freely displaced along a third axis that is perpendicular to the first axis. At the locking position, the locking member stops moving by coming into contact with an end surface of a columnar holding portion, which is formed at a base end portion of the return piston, so as to disable the return piston from moving in the direction of the first axis. At the non-locking position, the locking member separates from the end surface of the holding portion so as to enable the return piston to move in the direction of the first axis.

In the present invention, preferably, the locking member has a circular retaining hole, into which the holding portion of the return piston is capable of being fitted, and is disposed at a position at which the first axis extends through an interior of the retaining hole. In addition, preferably, the locking position is a position where the retaining hole is eccentric with respect to the holding portion, so that the end surface of the holding portion comes into contact with an edge of the retaining hole so as to be fixed in place, and the non-locking position is a position where the retaining hole is coaxial with the holding portion, so that the holding portion is capable of being fitted into the retaining hole.

In this case, the locking member may have a ring-like shape, and the retaining hole may be formed at the center of the locking member. In addition, the holding portion may have a diameter smaller than a diameter of a body portion of the return piston, and the retaining hole may have a diameter larger than a diameter of the holding portion and smaller than a diameter of the body portion.

In the present invention, the locking spring may be disposed on one side of the locking member on the third axis, and the unlocking piston may be disposed on another side of the locking member on the third axis.

In this case, an operation rod for manual operation may be coupled to the unlocking piston in such a manner as to extend along the third axis. In addition, a recess may be formed in a side surface of the first body in such a manner as to be located on the third axis, and an end portion of the operation rod may be disposed in the recess so as not to project outside from the recess.

Advantageous Effects of Invention

According to the present invention, even if air supply to a returning mechanism is shut off during the period when an operation for restraining a first body and a second body at a home position is performed by the returning mechanism, the first body and the second body can be kept restrained at the home position as a result of the returning mechanism being locked in the home position by a locking mechanism, and a high level of safety can be obtained.

DESCRIPTION OF EMBODIMENTS

Figure 1:
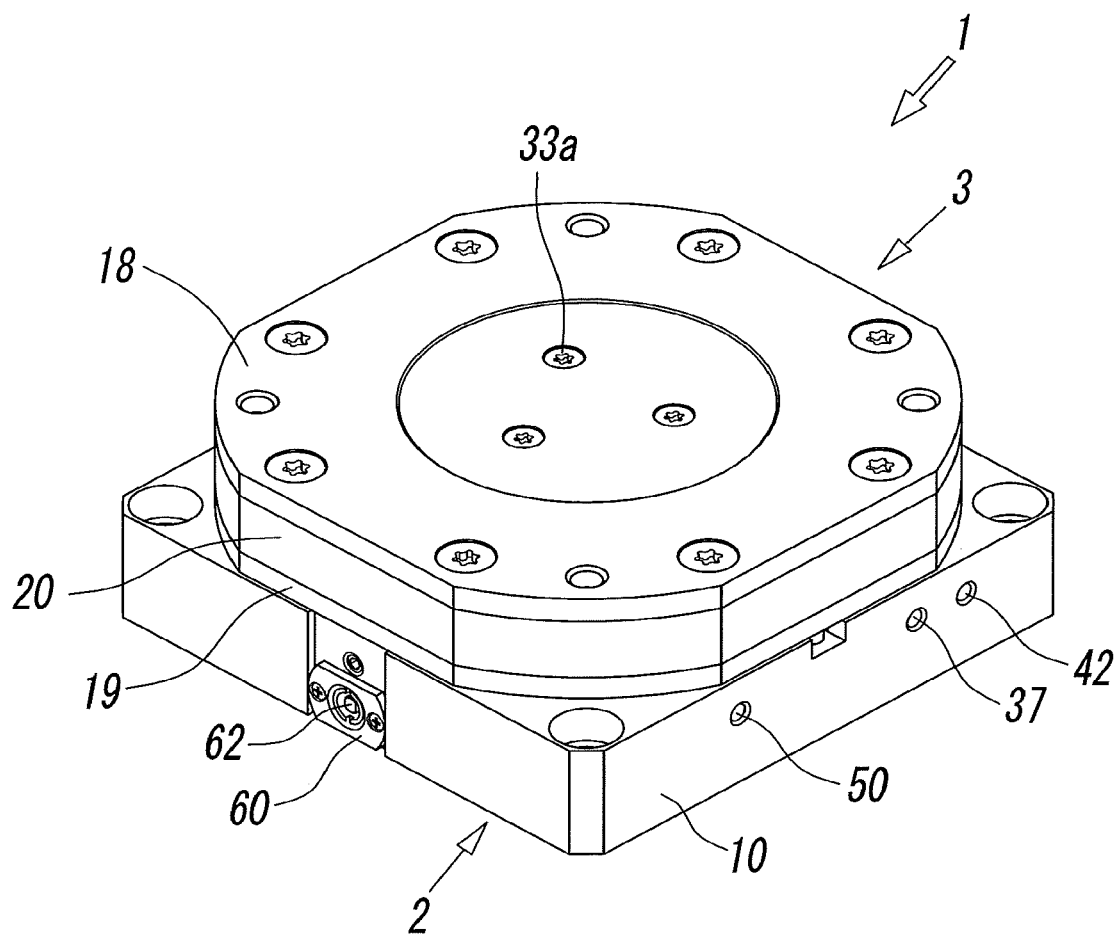
FIG. 1 is a perspective view of a compliance unit according to the present invention.

The drawings illustrate an embodiment of a compliance unit according to the present invention. As illustrated in FIG. 1 to FIG. 4, a compliance unit 1 includes a first body 2, a second body 3, a parallel movement mechanism 4 that causes the first body 2 and the second body 3 to move parallel relative to each other along a virtual plane that is perpendicular to a first axis L1, a returning mechanism 5 that causes the first body 2 and the second body 3, which have moved parallel to each other, to return to a home position and to be restrained at the home position, and a locking mechanism 6 that locks the returning mechanism 5 at the home position.

The first axis L1 is the central axis of the first body 2, and a second axis L2 (see FIG. 5) is the central axis of the second body 3. The home position is a position where the first axis L1 of the first body 2 and the second an axis L2 of the second body 3 coincide with each other as illustrated in FIG. 2.

The first body 2 includes a rectangular base portion 10 and a small-diameter cylinder portion 11 that has a cylindrical shape and that extends from the center of the base portion 10 along the first axis L1. An end of the cylinder portion 11 is located in a chamber 12 formed within the second body 3, and a base plate 13 that has a circular plate-like shape and that has a diameter larger than that of the cylinder portion 11 and smaller than that of the base portion 10 is fixed to a surface of the end by screws 14 so as to be coaxial with the first body 2. The top surface and the bottom surface of the base plate 13 are perpendicular to the first axis L1 and are formed as flat surfaces parallel to each other.

Figure 2:
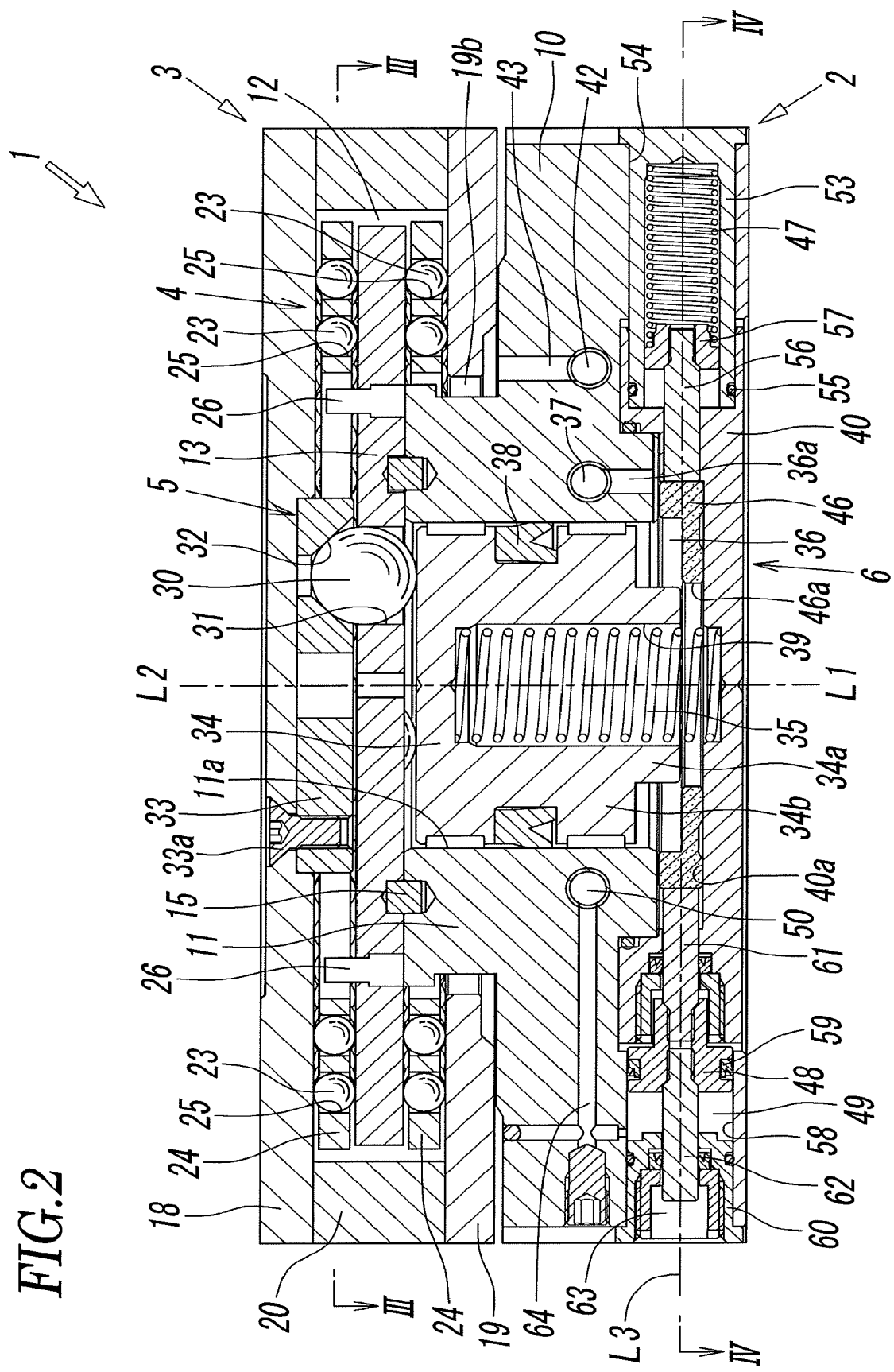
FIG. 2 is a central longitudinal sectional view and is a diagram illustrating a state where a returning mechanism and a locking mechanism respectively occupy a home position and a non-locking position by bringing both the returning mechanism and the locking mechanism into an air-supply state.
Figure 3:
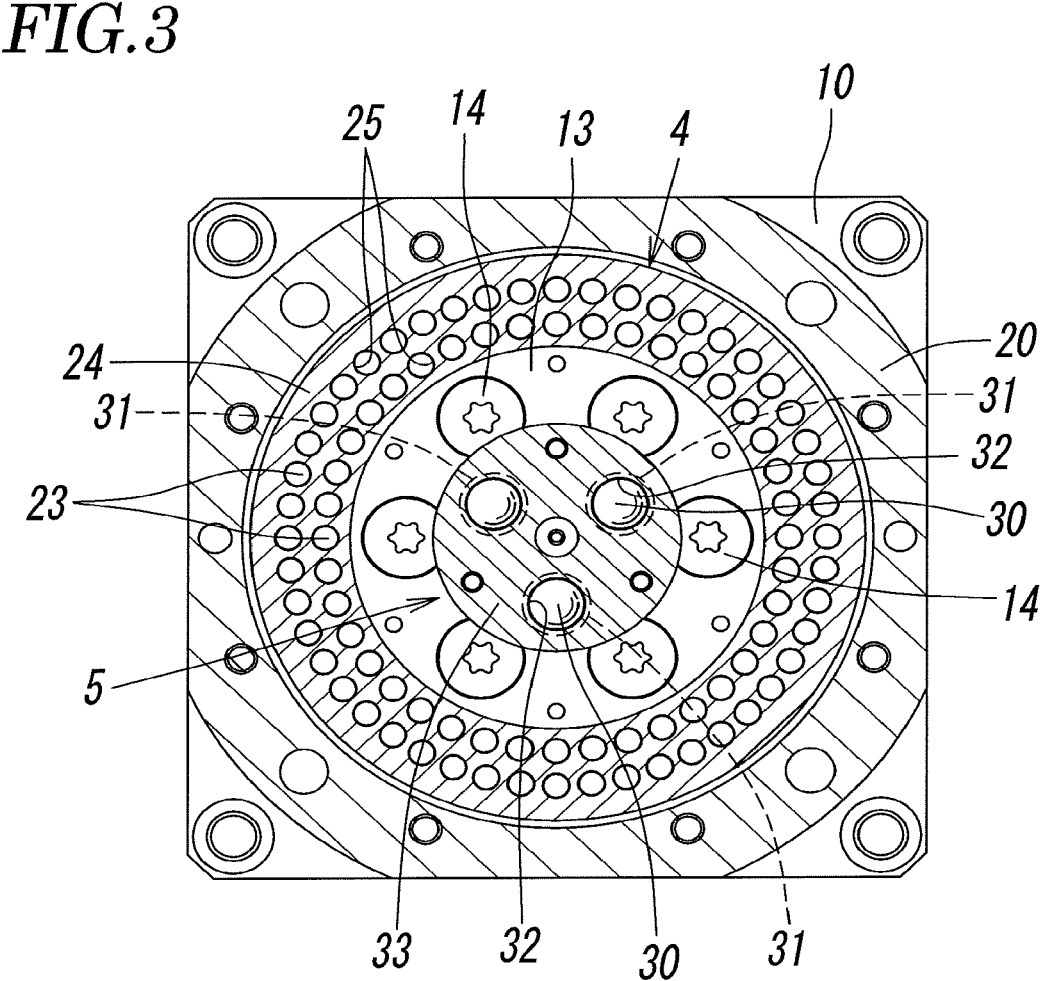
FIG. 3 is a sectional view taken along line III-III of FIG. 2.

The components each denoted by the reference sign 15 in FIG. 2 are positioning pins that determine the position to which the base plate 13 is fixed.

The second body 3 includes an outer shell plate 18 that covers the entire top surface of the base plate 13, an inner shell plate 19 that partly covers the bottom surface of the base plate 13 at a position close to the outer periphery end of the base plate 13, and a hollow spacer 20 that is disposed so as to surround the outer periphery of a side surface of the base plate 13 and that couples the outer shell plate 18 and the inner shell plate 19 to each other. The chamber 12 is defined by the outer shell plate 18, the inner shell plate 19, and the spacer 20. The cylinder portion 11 is inserted in the chamber 12 through a circular center hole 19b of the inner shell plate 19, and the base plate 13 is accommodated in the chamber 12. The bottom surface of the outer shell plate 18 and the top surface of the inner shell plate 19 are formed as flat surfaces that are parallel to the top surface and the bottom surface of the base plate 13.

The outer shell plate 18, the inner shell plate 19, and the spacer 20 each have an external shape obtained by, for example, removing portions of a circle in order to fit the external shape to the shape of the base portion 10 of the first body 2. However, by making each of the external shapes of the outer shell plate 18, the inner shell plate 19, and the spacer 20 circular, the second body 3 can be formed in a cylindrical shape.

In the chamber 12, the parallel movement mechanism 4 is formed of a plurality of balls 23, each of which is disposed so as to be capable of freely rolling between the top surface of the base plate 13 and the bottom surface of the outer shell plate 18 or between the bottom surface of the base plate 13 and the top surface of the inner shell plate 19, and retainers 24 that hold the balls 23. The balls 23 are each made of a hard material such as a metal. The retainers 24 are disposed between the base plate 13 and the outer shell plate 18 and between the base plate 13 and the inner shell plate 19, and a plurality of ball-holding holes 25 are formed in the retainers 24 at regular intervals along the circumference of two concentric circles. Each of the balls 23 is rotatably accommodated in a corresponding one of the ball-holding holes 25. The thickness of each of the retainers 24 is smaller than the diameter of each of the balls 23.

Figure 5:
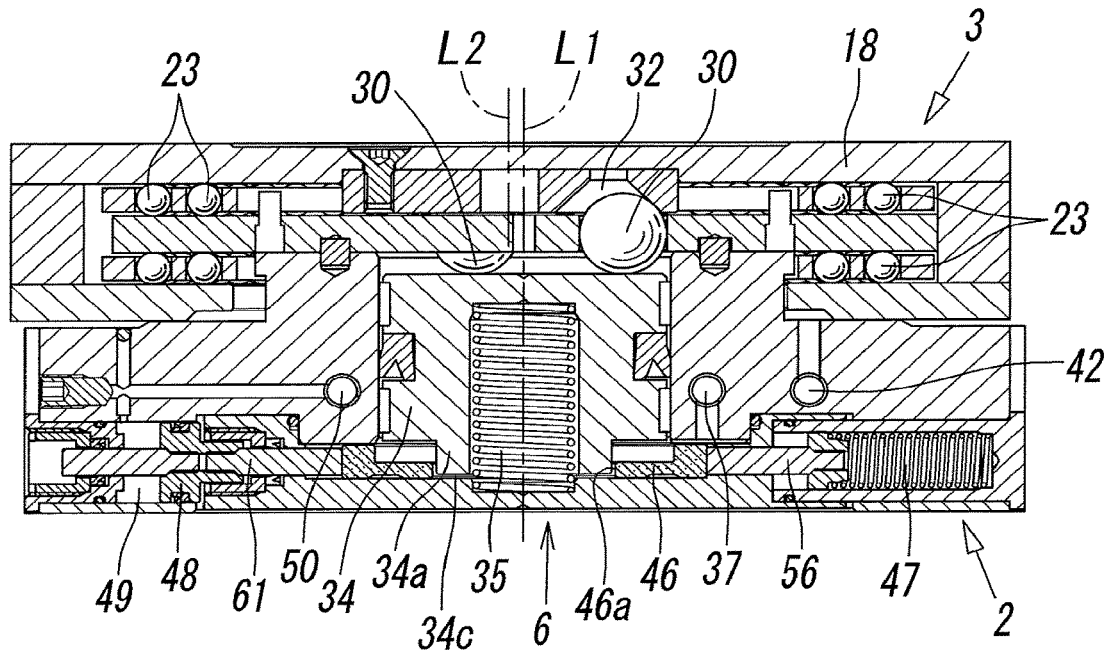
FIG. 5 is a sectional view at a position similar to that in FIG. 2 and is a diagram illustrating a state where a second body has been displaced in order to accommodate misalignment by bringing the returning mechanism into an air-exhaust state.
Figure 9:
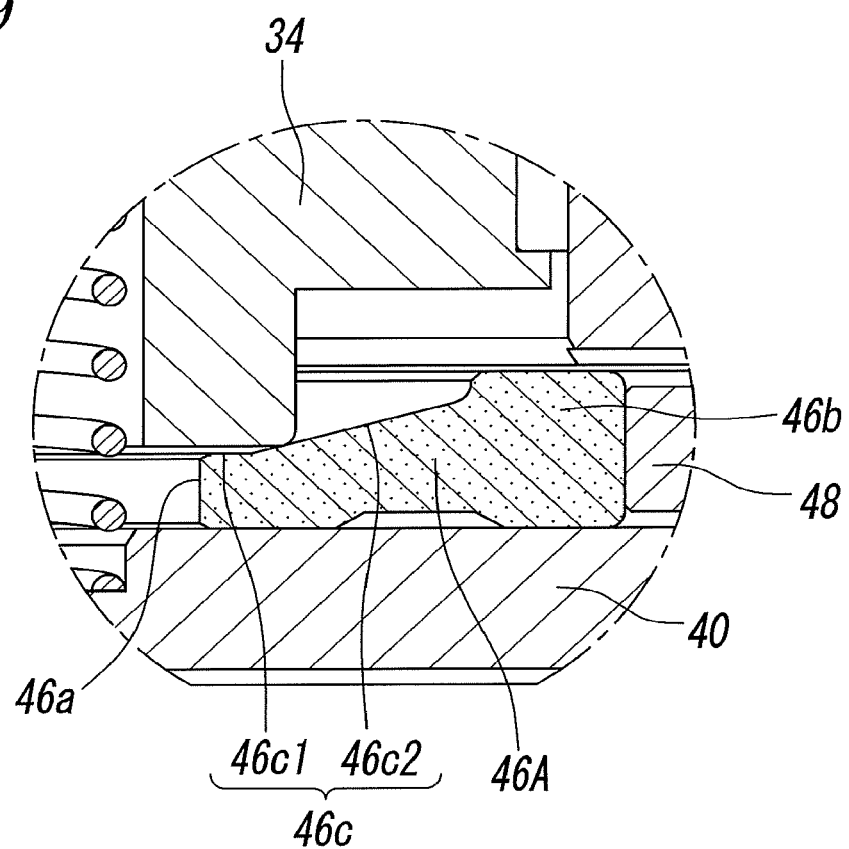
FIG. 9 is an enlarged sectional view at a position similar to that in FIG. 8 illustrating a principal portion and an example of a different type of structure of a locking member.
Figure 10:
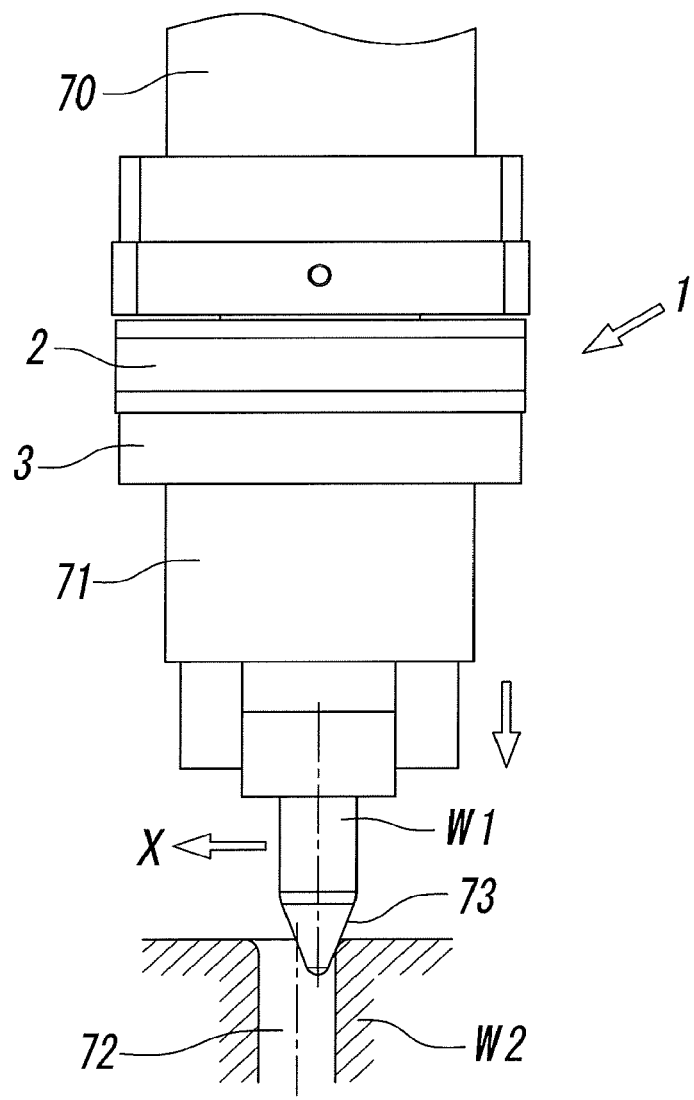
FIG. 10 is a front view illustrating a first usage example of the compliance unit.

With this configuration, as a result of the balls 23 rolling and coming into contact with the base plate 13, the outer shell plate 18, and the inner shell plate 19, the base plate 13, the outer shell plate 18, and the inner shell plate 19, that is, the first body 2 and the second body 3 can move parallel relative to each other within a predetermined area centered on the home position. FIG. 2 illustrates a state where the first body 2 and the second body 3 are located at the home position, and FIG. 5 illustrates a state where the first body 2 and the second body 3 have moved parallel to each other in order to accommodate misalignment between components as illustrated in FIG. 9 and FIG. 10.

Note that the members each denoted by the reference sign 26 in FIG. 2 are restricting pins attached to the base plate 13, and the restricting pins are used for restricting excessive movement of the retainer 24 disposed between the base plate 13 and the outer shell plate 18.

The returning mechanism 5 includes a plurality of ball-holding holes 31 that are formed in the base plate 13, balls 30 each of which is accommodated in a corresponding one of the ball-holding holes 31 so as to be capable of being freely displaced in the direction of the first axis L1 and so as to be fixed in place by coming into contact with the base plate 13 in a direction perpendicular to the first axis L1, conical holes 32 that are formed in a ball receiver 33, which has a circular plate-like shape and which is fixed to the second body 3, the number of the conical holes 32 being equal to that of the balls 30, a return piston 34 that is accommodated in a cylinder hole 11a, which is formed in the cylinder portion 11, so as to be capable of freely moving forward and rearward in the direction of the first axis L1, a return spring 35 and a return pressure chamber 36 that cause the return piston 34 to generate thrust in a direction in which the balls 30 are pressed against hole surfaces of the conical holes 32, and a return port 37 that supplies air to the return pressure chamber 36 via a through hole 36a.

The hole surface of each of the conical holes 32 is formed in a conical surface such that the hole diameter thereof increases with decreasing distance from the base plate 13. An end portion of each of the balls 30 is fitted in the corresponding one of the conical holes 32, and an end surface of the return piston 34 is in contact with base end portions of all the balls 30.

The members each denoted by the reference sign 33a in FIG. 2 are screws that fix the ball receiver 33 to the second body 3.

In the returning mechanism 5, as illustrated in FIG. 2, when each of the balls 30 is uniformly pressed, at the center of the corresponding conical hole 32, against the hole surface by the return piston 34, the first body 2 and the second body 3 occupy the home position, and as illustrated in FIG. 5, when the first body 2 and the second body 3 move parallel to each other, each of the balls 30 is displaced to a position that is eccentric with respect to the center of the conical hole 32 and is pushed by the inclined hole surface of the conical hole 32 so as to be also displaced in the direction of the first axis L1. As a result, the return spring 35 is compressed, so that the return piston 34 is moved rearward.

Although three balls 30 are provided around the first axis L1 at an angular pitch of 120 degrees, and three conical holes 32 are provided around the second an axis L2 at an angular pitch of 120 degrees, the number of the balls 30 and the number of the conical holes 32 may each be two or four or more. Alternatively, one ball 30 and one conical hole 32 may be respectively provided at a position on the first axis L1 and at a position on the second an axis.

The balls 30 are each made of a hard material such as a metal, and each have a diameter larger than the thickness of the base plate 13.

In addition, the return piston 34 has a columnar shape and is accommodated in the cylinder hole 11a via a piston packing member 38, and a short columnar holding portion 34a is formed at a base end portion of the return piston 34 in such a manner as to project from a body portion 34b of the return piston 34 along the first axis L1. The diameter of the holding portion 34a is smaller than the diameter of the body portion 34b.

The return spring 35 is disposed, in a compressed state, between the inner bottom of a spring chamber 39, which is formed in the return piston 34 along the first axis L1, and a cover 40 that is attached to an end surface of the first body 2 so as to cover the cylinder hole 11a and constantly presses the balls 30 via the return piston 34 in a direction in which the balls 30 are pressed against the conical holes 32. The spring force of the return spring 35 has a magnitude that can cause the second body 3 to return to the home position when a load that is generated at the time of accommodating misalignment is not applied to the second body 3 and against which the second body 3 can be displaced when the load generated at the time of accommodating misalignment is applied to the second body 3.

The return pressure chamber 36 is formed between the cover 40 and the base end surface of the return piston 34, and the return port 37 that is in communication with the return pressure chamber 36 is open to a side surface of the first body 2.

When the air is supplied to the return pressure chamber 36 through the return port 37, a large thrust that is the sum of the thrust generated by the air and the thrust of the return spring 35 acts on the return piston 34, and thus, the return piston 34 strongly presses the balls 30 against the hole surfaces of the conical holes 32. Accordingly, as illustrated in FIG. 2, each of the balls 30 promptly returns to the home position, at which the ball 30 is in contact with the center of the corresponding conical hole 32, and is restrained and maintained at the home position even if the load generated at the time of accommodating misalignment is applied to the second body 3. Thus, the second body 3 is also restrained at the home position and will not be able to be displaced. This restrained state is maintained during the period when the air is being supplied to the return pressure chamber 36. Therefore, it can be said that the restrained state is a locking state by the air.

Although the chamber 12 is isolated from the return pressure chamber 36 by the piston packing member 38, the chamber 12 is not completely isolated from the outside air and communicates with the outside air through, for example, a gap between the upper end surface of the base portion 10 of the first body 2 and the lower end surface of the inner shell plate 19 of the second body 3. Accordingly, in order to prevent dust contained in the outside air from entering the chamber 12, a purge port 42 is formed in the first body 2 in such a manner as to communicate with the chamber 12 via a through hole 43, and the air pressure in the chamber 12 becomes higher than the outside air as a result of the air being supplied to the chamber 12 through the purge port 42, so that dust contained in the outside air is prevented from entering the chamber 12 through the above-mentioned gap.

The locking mechanism 6 includes a locking member 46 that is capable of being freely displaced to a locking position (see FIG. 6 and FIG. 7) where the locking member 46 is fixed in place by being in contact with the return piston 34 and to a non-locking position (see FIG. 4 and FIG. 5) where the locking member 46 is not in contact with the return piston 34 and is not fixed in place, a locking spring 47 that presses the locking member 46 toward the locking position, an unlocking piston 48 that presses the locking member 46 toward the non-locking position, an unlocking pressure chamber 49 that causes the unlocking piston 48 to generate thrust, and an unlocking port 50 for supplying air to the unlocking pressure chamber 49.

Figure 8:
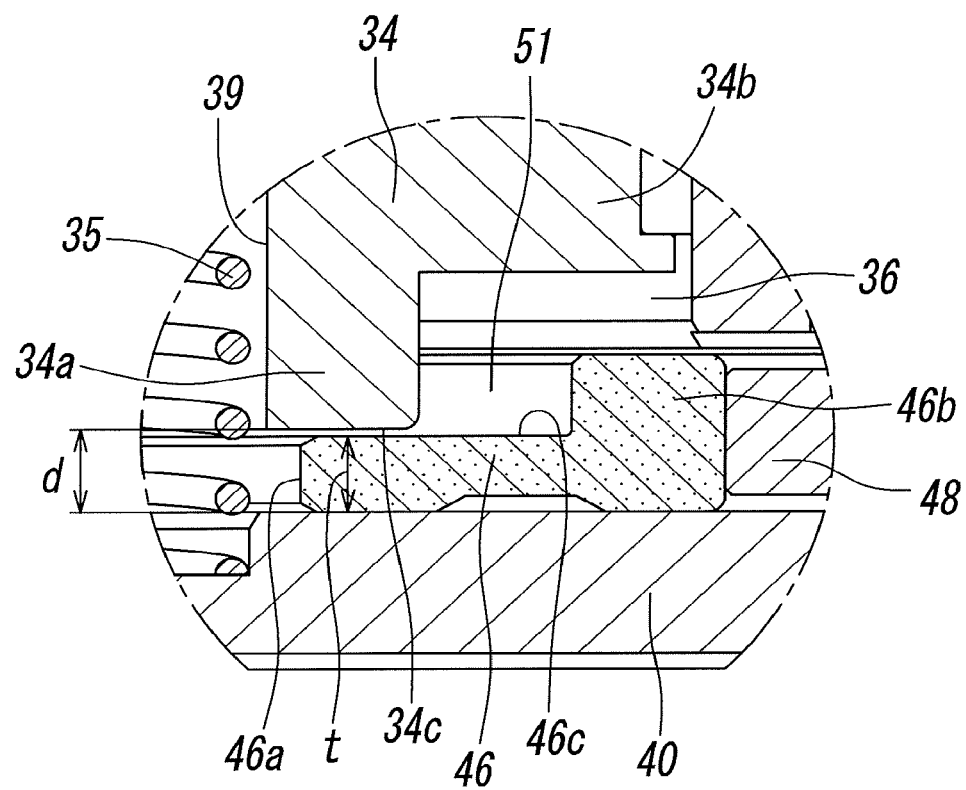
FIG. 8 is an enlarged view of the principal portion in FIG. 6.

The locking member 46 is a ring-shaped member and, as seen from FIG. 8, has a circular retaining hole 46a that is formed at the center of the locking member 46 and that is large enough for the holding portion 34a of the return piston 34 to be fitted thereinto and a ring-shaped flange 46b that is formed at the outer peripheral portion of the locking member 46 and that protrudes toward the second body 3. The top surface of the locking member 46 includes a holding surface 46c extending from a hole edge of the retaining hole 46a to the flange 46b, and the holding surface 46c is formed as a flat surface that is perpendicular to the first axis L1.

The locking member 46 is disposed, in a position in which the first axis L1 extends through the interior of the retaining hole 46a, in an accommodating chamber 51 forming part of the return pressure chamber 36 and is capable of being freely displaced to the above-mentioned locking position and to the above-mentioned non-locking position along a third axis L3 that is perpendicular to the first axis L1. In addition, the locking member 46 is disposed in an oval shallow recess 40a, which is formed in the top surface of the cover 40, such that the movable range of the locking member 46 is limited by the recess 40a, and a position at which the locking member 46 is displaced to one end side of the recess 40a and a position at which the locking member 46 is displaced to the other end side of the recess 40a correspond to the locking position and the non-locking position, respectively.

Figure 4:
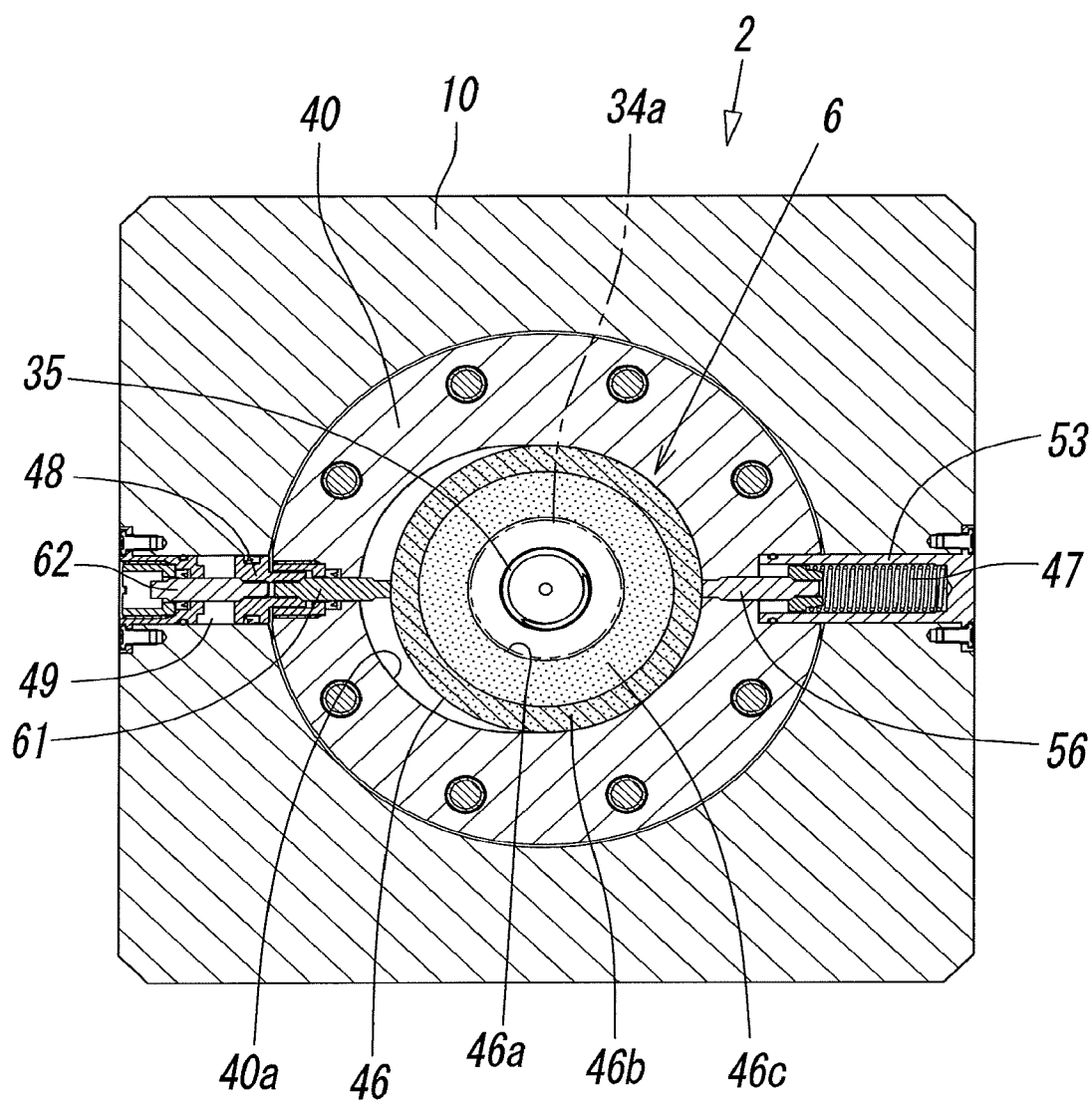
FIG. 4 is a sectional view taken along line IV-IV of FIG. 2.
Figure 6:
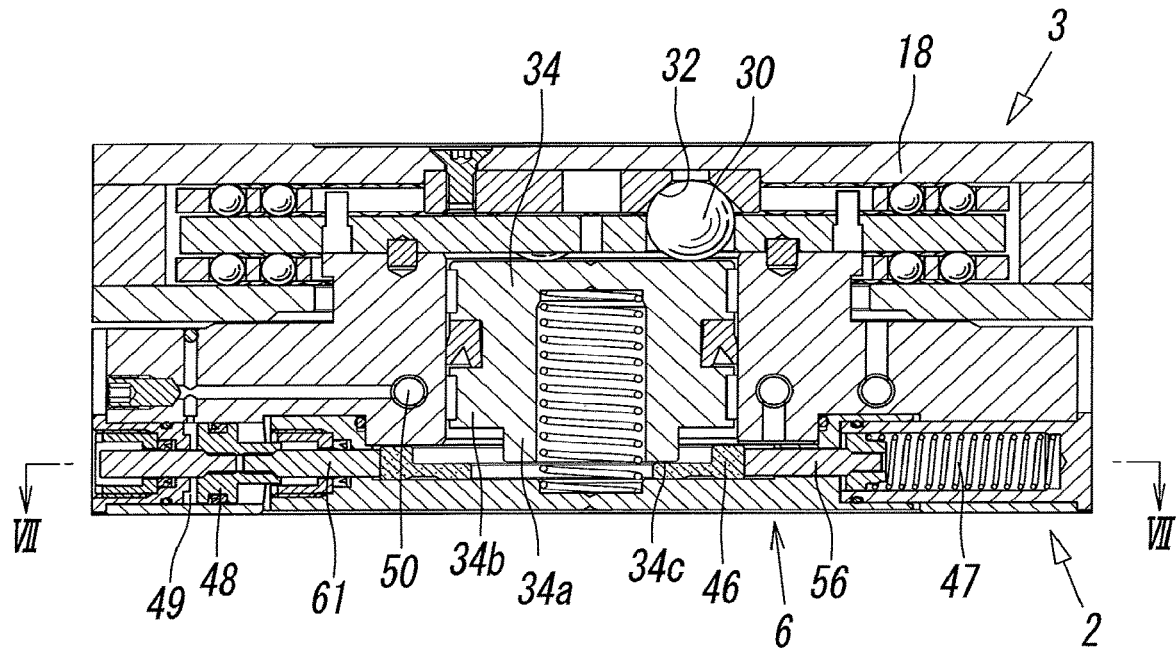
FIG. 6 is a sectional view at a position similar to that in FIG. 2 and is a diagram illustrating a state where the returning mechanism has been locked in the home position by the locking mechanism as a result of the returning mechanism and the locking mechanism being brought into the air-exhaust state by shutting off the air supply thereto.
Figure 7:
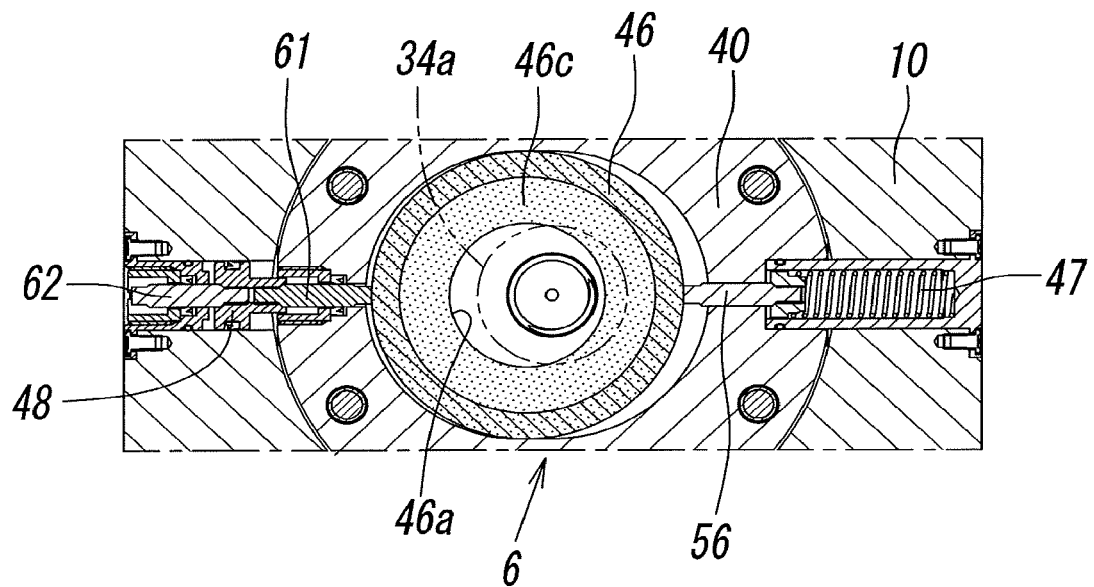
FIG. 7 is a sectional view illustrating a principal portion taken along line VII-VII of FIG. 6.

As illustrated in FIG. 6 and FIG. 7, the locking position is a position where the retaining hole 46a occupies a position eccentric with respect to the holding portion 34a, so that the holding surface 46c is fixed in place by being in contact with an end surface 34c of the holding portion 34a, and as illustrated in FIG. 4 and FIG. 5, the non-locking position is a position where the retaining hole 46a is coaxial with the holding portion 34a, so that the holding surface 46c is spaced apart from and is not in contact with the end surface 34c and is not fixed in place, that is, a position where the holding portion 34a can be fitted into the retaining hole 46a. Thus, the diameter of the retaining hole 46a is set to be larger than the diameter of the holding portion 34a of the return piston 34 and to be smaller than the diameter of the body portion 34b.

The locking spring 47 and the unlocking piston 48 are respectively disposed on one side of the locking member 46 and on the other side of the locking member 46 along the third axis L3.

The locking spring 47 is accommodated in a spring holder 53 having a cylindrical shape, and the spring holder 53 is airtightly accommodated and fixed in place in a holder accommodating hole 54, which is formed by the first body 2 and the cover 40, with a seal member 55 interposed between the spring holder 53 and the holder accommodating hole 54. A push rod 56 is interposed between the locking spring 47 and the locking member 46 so as to extend along the third axis L3. A proximal end portion of the push rod 56 is in contact with an end of the locking spring 47 via a spring seat 57, and a distal end of the push rod 56 is in contact with a side surface of the locking member 46. As a result, the spring force of the locking spring 47 acts on the locking member 46 via the push rod 56 such that the locking member 46 is constantly pressed toward the locking position.

In contrast, the unlocking piston 48 is disposed in a piston chamber 58, which is formed in the first body 2, with a seal member 59 interposed between the unlocking piston 48 and the piston chamber 58 so as to be capable of freely sliding in the direction of the third axis L3, and the unlocking pressure chamber 49 is formed between the unlocking piston 48 and a tubular plug member 60 closing an end portion of the piston chamber 58. A piston rod 61 extending in a direction toward the locking member 46 along the third axis L3 is coupled to the unlocking piston 48, and an end of the piston rod 61 is in contact with the side surface of the locking member 46. In addition, an operation rod 62 for manual operation is coupled to the unlocking piston 48 in such a manner as to extend in a direction away from the piston rod 61 along the third axis L3, and an end portion of the operation rod 62 is disposed in a recess 63, which is formed in the side surface of the first body 2 by the plug member 60, so as not to project to the outside from the recess 63.

The unlocking port 50 is formed in the side surface of the first body 2 and communicates with the unlocking pressure chamber 49 via a through hole 64 formed in the first body 2.

The locking mechanism 6 operates in the following manner. That is to say, as illustrated in FIG. 2 and FIG. 4, when air is supplied to the unlocking pressure chamber 49 through the unlocking port 50, the unlocking piston 48 and the piston rod 61 are moved forward by thrust generated by the air, and thus, the locking member 46 is pushed by the piston rod 61 so as to be displaced to the non-locking position. In this case, the locking spring 47 is compressed as a result of being pushed by the push rod 56.

In contrast, as illustrated in FIG. 6 and FIG. 7, when the unlocking port 50 is opened under atmospheric pressure, the thrust generated by the unlocking piston 48 disappears, and thus, the locking member 46 is displaced to the locking position by the locking spring 47 via the push rod 56.

For example, the locking mechanism 6 enables an operation for accommodating misalignment between workpieces by causing the first body 2 and the second body 3 to move parallel to each other by causing the return port 37 to be opened under atmospheric pressure as described above in a state where the locking member 46 has been displaced to the non-locking position by supplying air to the unlocking port 50 and an operation for causing the second body 3 to return to the home position and to be restrained at the home position by supplying air to the return port 37.

In this case, as illustrated in FIG. 2, in a state where the second body 3 is restrained at the home position by supplying air to the return port 37, when the air supply to the return port 37 is shut off, the air supply to the unlocking port 50 is also shut off. Thus, as illustrated in FIG. 6, the locking member 46 is pushed by the locking spring 47 so as to be displaced to the locking position and stops moving by coming into contact with the end surface 34c of the holding portion 34a of the return piston 34, so that the return piston 34, that is, the second body 3 is mechanically locked in the home position by the locking member 46.

However, when the second body 3 is at the home position, and an operation for accommodating misalignment between workpieces is not performed, that is, when the second body 3 does not need to have any degree of freedom, the locking mechanism 6 can also operate such that the unlocking port 50 is brought into an air-exhaust state so as to cause the locking member 46 to be displaced to the locking position and to stop moving by coming into contact with the return piston 34, so that the second body 3 is mechanically locked in the home position. By performing such an operation, when the air supply to the return port 37 is shut off, the return piston 34, that is, the second body 3 can be locked in the home position with higher certainty.

Note that, although the holding portion 34a included in the return piston 34 is formed so as to have a diameter smaller than that of the body portion 34b of the return piston 34, the holding portion 34a may have the same diameter as that of the body portion 34b or may have a larger diameter than the body portion 34b.

FIG. 9 illustrates a second-type locking member 46A that has a configuration different from that of the first-type locking member 46 illustrated in FIG. 8. The difference between the second-type locking member 46A and the above-described first-type locking member 46 is that the holding surface 46c included in the top surface of the second-type locking member 46A has a flat portion 46c1 on the inner periphery side and an inclined portion 46c2 on the outer periphery side. The flat portion 46c1 is a portion adjacent to the retaining hole 46a and is a flat surface that is perpendicular to the first axis L1, and the inclined portion 46c2 is a portion extending from the flat portion 46c1 to the flange 46b and is a surface that is inclined in a direction in which the distance between the surface and the return piston 34 gradually decreases from the outer periphery side to the inner periphery side.

In the case of the first-type locking member 46, in order to cause the locking member 46 to be displaced to the locking position, as illustrated in FIG. 8, it is necessary to set a thickness t of the locking member 46 to be smaller than a gap d between the end surface 34c of the holding portion 34a of the return piston 34 and the top surface of the cover 40. Thus, when the locking member 46 is fixed in place by coming into contact with the return piston 34 so as to lock the returning mechanism 5 in the home position, the return piston 34 can move rearward by a distance equal to the difference between the gap d and the thickness t, and thus, the second body 3 can also be displaced by a distance equal to the difference.

In contrast, in the case of the second-type locking member 46 illustrated in FIG. 9, movement of the piston can be almost completely restrained by bringing the inclined portion 46c2 into contact with the end surface 34c of the holding portion 34a of the piston, and thus, displacement of the second body 3 can also be almost completely restrained.

FIG. 10 illustrates a first usage example of the above-described compliance unit 1. The first usage example is an example in which a first workpiece W1 and a second workpiece W2 are coupled to each other in an automatic assembly process of a product performed by an assembly robot. In this case, a robot hand 70 of the assembly robot is coupled to the first body 2 of the compliance unit 1, and a workpiece-holding unit 71 is attached to the second body 3. Then, the first workpiece W1 in a storage portion is held by the workpiece-holding unit 71 and transported to the position of the second workpiece W2, and then, the first workpiece W1 is inserted into an insertion hole 72 formed in the second workpiece.

When the first workpiece W1 is transported, as illustrated in FIG. 6, the return port 37 of the compliance unit 1 is brought into an air-supply state, and the unlocking port 50 is brought into the air-exhaust state, so that the locking member 46 is fixed in place by coming into contact with the return piston 34, and as a result, the second body 3 is locked in the home position. Thus, the first workpiece W1 is stably transported without an occurrence of, for example, a positional deviation.

After the first workpiece W1 has been transported to a position above the second workpiece W2, the return port 37 is brought into the air-exhaust state, and the unlocking port 50 is brought into the air-supply state. Accordingly, as illustrated in FIG. 2, the locking member 46 is displaced to the non-locking position, and thus, only the spring force of the return spring 35 acts on the return piston 34 of the returning mechanism 5, and as a result, the compliance unit 1 has a degree of freedom, that is, the second body 3 is at the home position and is displaceable with respect to the first body 2. In this state, the first workpiece W1 is inserted into the insertion hole 72.

In this case, if there is a misalignment between the first workpiece W1 and the insertion hole 72, as illustrated in FIG. 10, a force in the direction of arrow X acts on the first workpiece W1 as a result of an inclined surface 73 of the first workpiece W1 being brought into contact with the hole edge of the insertion hole 72, and the second body 3 is displaced by this force as illustrated in FIG. 5. Therefore, the misalignment is accommodated, and the first workpiece W1 is inserted into the insertion hole 72.

When the workpiece-holding unit 71 releases the first workpiece W1 after the insertion of the first workpiece W1 has been completed, the return port 37 is brought into the air-supply state again, and as a result, the compliance unit 1 returns to the home position as illustrated in FIG. 2. In this case, by bringing the unlocking port 50 into the air-exhaust state, the second body 3 can also be locked in the home position. Then, the workpiece-holding unit 71 holds a new first workpiece W1 and repeats an operation similar to the above.

Here, if the air supply to the returning mechanism 5 is shut off due to an unexpected cause during the period when the first workpiece W1 is being transported, the thrust that is generated by the air and that acts on the return piston 34 also disappears. Thus, in the case of a commonly known compliance unit, the first body 2 and the second body 3 are each released from being restrained so as to have a degree of freedom, and there is a possibility that positional deviation of the first workpiece W1 will occur as a result of the second body 3 being displaced and that the first workpiece W1 will break by, for example, coming into contact with a peripheral device.

However, in the compliance unit 1 according to the present invention, since the second body 3 is locked in the home position by the locking member 46, even if the air is shut off in this state, positional deviation of the first workpiece W1 due to displacement of the second body 3 will not occur.

Figure 11:
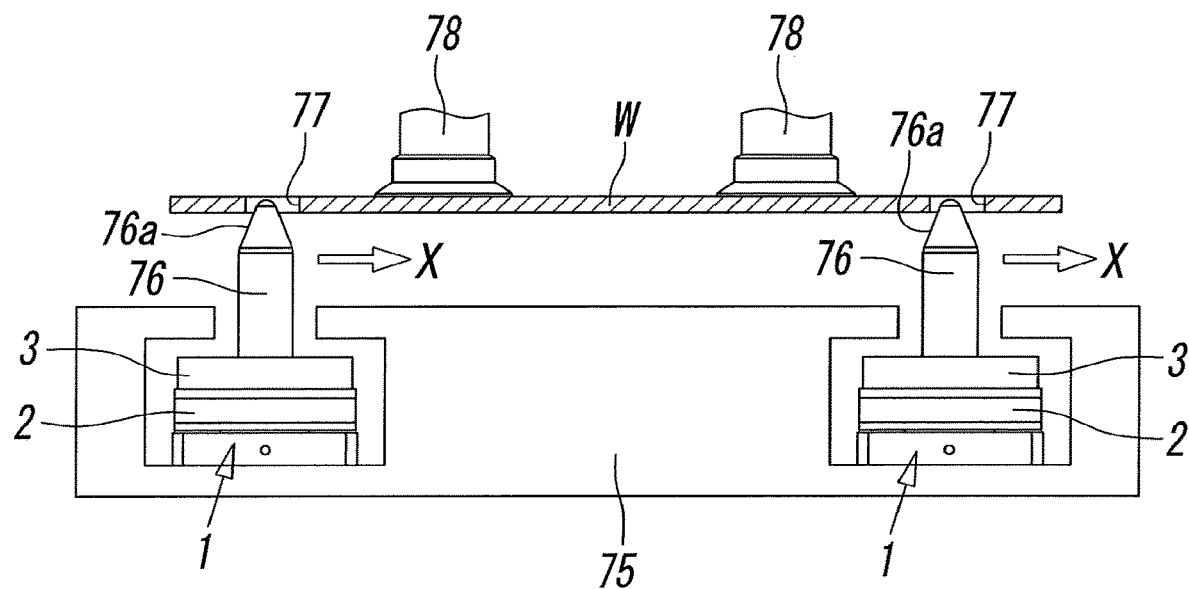
FIG. 11 is a sectional view illustrating a second usage example of the compliance unit.

FIG. 11 illustrates a second usage example of the above-described compliance unit 1. The second usage example is an example in which, when setting a workpiece W that is to be subjected to processing such as welding, painting, cutting, and the like at a predetermined position on a worktable 75, the workpiece W is positioned by fitting positioning pins 76, which are attached to the compliance units 1, into positioning holes 77 of the workpiece W. In this case, the first bodies 2 of the compliance units 1 are attached to the side of the worktable 75, and each of the positioning pins 76 is attached to a corresponding one of the second bodies 3.

When the above positioning is performed, the return port 37 of the compliance unit 1 is brought into the air-exhaust state, and the unlocking port 50 is brought into the air-supply state.

In this state, the workpiece W is transported to a position above the worktable 75 by chuck members 78 of a transport device and set such that the positioning pins 76 are fitted into the positioning holes 77. In this case, if there is a misalignment between the positioning holes 77 and the positioning pins 76, a force in the direction of arrow X acts on the positioning pins 76 as a result of an inclined surface 76a of each of the positioning pins 76 being brought into contact with the hole edge of the corresponding positioning hole 77, so that the second body 3 is displaced by this force as illustrated in FIG. 5 so as to accommodate the misalignment.

Then, by bringing the return port 37 into the air-supply state, the second body 3 returns to the home position as illustrated in FIG. 2. Along with this, the workpiece W moves to a predetermined position by being pulled by the positioning pins 76 and undergoes predetermined processing at this predetermined position while being positioned by the positioning pins 76. In this case, by bringing the unlocking port 50 into the air-exhaust state, the second body 3 is locked in the home position by the locking member 46.

The workpiece W that has undergone the processing is removed from the worktable 75 by the transport devices 78. In this case, the unlocking port 50 is brought into the air-supply state so as to displace the locking member 46 to the non-locking position, and the return port 37 is switched to the air-exhaust state so as to cause the second body 3, that is, the positioning pins 76 to have a degree of freedom, so that twisting between the positioning pins 76 and the workpiece can be prevented from occurring.

In addition, even if the air supply to the returning mechanism 5 is shut off due to an unexpected cause when the first workpiece W1 undergoes the processing, since the second body 3 is locked in the home position, an undesirable situation in which the workpiece W is displaced as a result of the second body 3, that is, the positioning pins 76 being displaced will not occur.

REFERENCE SIGNS LIST

1: compliance unit
2: first body
3: second body
5: returning mechanism
6: locking mechanism
30: ball
32: conical hole
34: return piston
34*a*: holding portion
34*b*: body portion
34*c*: end surface
35: return spring
36: return pressure chamber
37: return port
46, 46A: locking member
46*a*: retaining hole
47: locking spring
48: unlocking piston
49: unlocking pressure chamber
50: unlocking port
62: operation unit
63: recess
L1: first axis
L2: second axis
L3: third axis

The invention claimed is:

1. A compliance unit with a locking mechanism, the compliance unit comprising:
   a first body and a second body that are capable of moving parallel relative to each other within a predetermined area centered on a home position;
   a returning mechanism that causes the first body and the second body to return to the home position; and
   a locking mechanism that locks the returning mechanism in the home position,
   wherein the home position is a position where a first axis that is a central axis of the first body and a second axis that is a central axis of the second body coincide with each other,
   wherein the returning mechanism includes
      a ball that is disposed in the first body so as to be capable of being freely displaced in a direction along the first axis and so as to be integrated with the first body in a direction perpendicular to the first axis,
      a conical hole that is formed at a position in the second body at which an end portion of the ball is fitted into the conical hole,
      a return piston that is disposed in the first body so as to be capable of freely moving forward and rearward in the direction along the first axis and that is in contact with a base end portion of the ball at an end of the return piston,
      a return spring and a return pressure chamber that cause the return piston to generate thrust in a direction in which the ball is pressed against the conical hole, and
      a return port for supplying air to the return pressure chamber, and
   wherein the locking mechanism includes
      a locking member that is capable of being freely displaced to a locking position where the locking member is fixed in place by being in contact with the return piston and to a non-locking position where the locking member is not in contact with the return piston and is not fixed in place,
      a locking spring that presses the locking member toward the locking position,
      an unlocking piston that presses the locking member toward the non-locking position,
      an unlocking pressure chamber that causes the unlocking piston to generate thrust, and
      an unlocking port for supplying air to the unlocking pressure chamber.

2. The compliance unit according to claim 1,
   wherein the locking member is disposed so as to be capable of being freely displaced along a third axis that is perpendicular to the first axis,
   wherein, at the locking position, the locking member stops moving by coming into contact with an end surface of a columnar holding portion, which is formed at a base end portion of the return piston, so as to disable the return piston from moving in the direction of the first axis, and
   wherein, at the non-locking position, the locking member separates from the end surface of the holding portion so as to enable the return piston to move in the direction of the first axis.

3. The compliance unit according to claim 2,
   wherein the locking member has a circular retaining hole, into which the holding portion of the return piston is capable of being fitted, and is disposed at a position at which the first axis extends through an interior of the retaining hole,
   wherein the locking position is a position where the retaining hole is eccentric with respect to the holding portion, so that the end surface of the holding portion comes into contact with an edge of the retaining hole so as to be fixed in place, and
   wherein the non-locking position is a position where the retaining hole is coaxial with the holding portion, so that the holding portion is capable of being fitted into the retaining hole.

4. The compliance unit according to claim 3,
wherein the locking member has a ring-like shape, and
wherein the retaining hole is formed at the center of the locking member.

5. The compliance unit according to claim 3,
wherein the holding portion has a diameter smaller than a diameter of a body portion of the return piston,
wherein the retaining hole has a diameter larger than a diameter of the holding portion and smaller than a diameter of the body portion.

6. The compliance unit according to claim 2,
wherein the locking spring is disposed on one side of the locking member on the third axis, and the unlocking piston is disposed on another side of the locking member on the third axis.

7. The compliance unit according to claim 6,
wherein an operation rod for manual operation is coupled to the unlocking piston in such a manner as to extend along the third axis,
wherein a recess is formed in a side surface of the first body in such a manner as to be located on the third axis, and
wherein an end portion of the operation rod is disposed in the recess so as not to project outside from the recess.

* * * * *